United States Patent
Scipio et al.

(10) Patent No.: US 9,243,564 B2
(45) Date of Patent: Jan. 26, 2016

(54) SYSTEMS AND METHODS FOR REMOVING IMPURITIES FROM HEAVY FUEL OIL

(75) Inventors: Alston Ilford Scipio, Atlanta, GA (US); Sanji Ekanayake, Atlanta, GA (US); Paul Robert Fernandez, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 595 days.

(21) Appl. No.: 13/602,545

(22) Filed: Sep. 4, 2012

(65) Prior Publication Data

US 2014/0060061 A1    Mar. 6, 2014

(51) Int. Cl.
*F02C 7/22*    (2006.01)
*F02C 3/20*    (2006.01)

(52) U.S. Cl.
CPC ... *F02C 7/22* (2013.01); *F02C 3/20* (2013.01); *F05D 2300/125* (2013.01)

(58) Field of Classification Search
CPC ......... F02C 3/20; F02C 7/22; F05D 2300/125
USPC ........................................................ 123/1 A
See application file for complete search history.

(56) References Cited

U.S. PATENT DOCUMENTS

| | | | |
|---|---|---|---|
| 5,560,710 A * | 10/1996 | Klocke et al. | 366/336 |
| 6,632,257 B1 | 10/2003 | Feitelberg et al. | |
| 7,707,816 B2 | 5/2010 | Takahashi et al. | |
| 7,947,167 B2 | 5/2011 | Osaheni et al. | |
| 8,012,344 B2 | 9/2011 | Kulkarni et al. | |
| 2005/0072137 A1 | 4/2005 | Hokari et al. | |
| 2008/0072605 A1* | 3/2008 | Hagen et al. | 60/776 |
| 2009/0114569 A1 | 5/2009 | Osaheni et al. | |
| 2010/0077653 A1* | 4/2010 | Hughes et al. | 44/354 |
| 2010/0255431 A1 | 10/2010 | Moliere et al. | |
| 2010/0255432 A1 | 10/2010 | Fuentes et al. | |

OTHER PUBLICATIONS

Soares, Claire. Gas Turbines—A Handbook of Air, Land, and Sea Applications. 2008. Elsevier. pp. 253-264. Online version available at: http://app.knovel.com/hotlink/toc/id:kpGTAHALS1/gas-turbines-handbook/gas-turbines-handbook.*

* cited by examiner

*Primary Examiner* — Phutthiwat Wongwian
*Assistant Examiner* — Marc Amar
(74) *Attorney, Agent, or Firm* — Sutherland Asbill & Brennan LLP

(57) ABSTRACT

A fuel delivery system for use with a flow of heavy fuel oil for a gas turbine engine may include one or more fuel lines in communication with the gas turbine engine and a magnesium mixing system positioned upstream of the one or more fuel lines. The magnesium mixing system may include a flow of magnesium and a flow of a carrier fluid, a carrier mixing chamber to mix the flow of magnesium and the flow of the carrier fluid to form a mixed carrier flow, and a heavy fuel oil mixing chamber to mix the flow of heavy fuel oil and the mixed carrier flow.

12 Claims, 1 Drawing Sheet

SYSTEMS AND METHODS FOR REMOVING IMPURITIES FROM HEAVY FUEL OIL

TECHNICAL FIELD

The present application and the resultant patent relate generally to gas turbine engines and fuel systems thereof and more particularly relate to systems and methods for reducing the impact of metallic impurities such as vanadium and the like from combustion of heavy fuel oil by mitigating the post-combustion impact to the gas turbine hot gas path components.

BACKGROUND OF THE INVENTION

Heavy duty gas turbines may be operated on natural gas, light crude oil, heavy fuel oil, residual fuel oil, and other types of low grade combustible liquid fuels. (The various fuels in single or in combination will be referred to as heavy fuel oil herein.) Such low grade fuels may be relatively inexpensive but such fuels may contain undesirable contaminants such as vanadium and other types of metallics. During combustion, vanadium reacts to form undesirable corrosive compounds such as vanadium oxide ($V_2O_5$). These vanadium compounds may have a corrosive effect on hot gas path components in the gas turbine engine. Specifically, vanadium compounds may form hard corrosive deposits on the turbine nozzles and buckets so to reduce hot gas path component lifetime and overall performance and reliability.

Magnesium-based compounds may be added to the flow of fuel so as to mitigate the corrosive effects of vanadium. Magnesium may form relatively low melting alloys with vanadium. These magnesium alloys may be removed more easily from the surface of turbine nozzles, buckets, and other hot gas path components. Known methods for adding magnesium to the flow of fuel oil, however, may result in a non-homogenous mixture of the protective magnesium in the fuel stream. As such, not all of the hot gas path components may be adequately or consistently protected. Moreover, magnesium slugging in the flow of fuel oil may disrupt the operation of the entire fuel delivery system.

There is thus a desire for improved systems and methods for providing heavy fuel oils and the like with treatment for impurity removal for combustion in a gas turbine engine. Such improved systems and methods may better deliver magnesium to the flow of heavy fuel oil so as to reduce hot gas path component corrosion and, hence, improve component lifetime with increased overall gas turbine performance and reliability.

SUMMARY OF THE INVENTION

The present application and the resultant patent thus provide a fuel delivery system for use with a flow of heavy fuel oil for a gas turbine engine. The fuel delivery system may include one or more fuel lines in communication with the gas turbine engine and a magnesium mixing system positioned upstream of the one or more fuel lines. The magnesium mixing system may include a flow of magnesium and a flow of a carrier fluid, a carrier mixing chamber to mix the flow of magnesium and the flow of the carrier fluid to form a mixed carrier flow, and a heavy fuel oil mixing chamber to mix the flow of heavy fuel oil and the mixed carrier flow.

The present application and resultant patent further provide a method of providing a flow of heavy fuel oil to a gas turbine. The method may include the steps of mixing a flow of magnesium and a flow of a carrier fluid to form a mixed carrier flow, pumping the flow of heavy fuel oil to a mixing chamber, mixing the flow of heavy fuel oil and the mixed carrier flow in the mixing chamber to form a homogeneous flow, and flowing the homogeneous flow to the gas turbine.

The present application and resultant patent further provide a magnesium mixing system for use with a flow of heavy fuel oil for a gas turbine engine. The magnesium mixing chamber may include a flow of magnesium, a flow of a carrier fluid, a carrier mixing chamber to mix the flow of magnesium and the flow of the carrier fluid to form a mixed carrier flow, and a heavy fuel oil mixing chamber to mix the flow of heavy fuel oil and the mixed carrier flow.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 2 is a schematic diagram of a heavy fuel oil delivery system as may be described herein and as may be used with the combustor of the gas turbine engine of FIG. 1 and the like.

DETAILED DESCRIPTION

Figure 1:
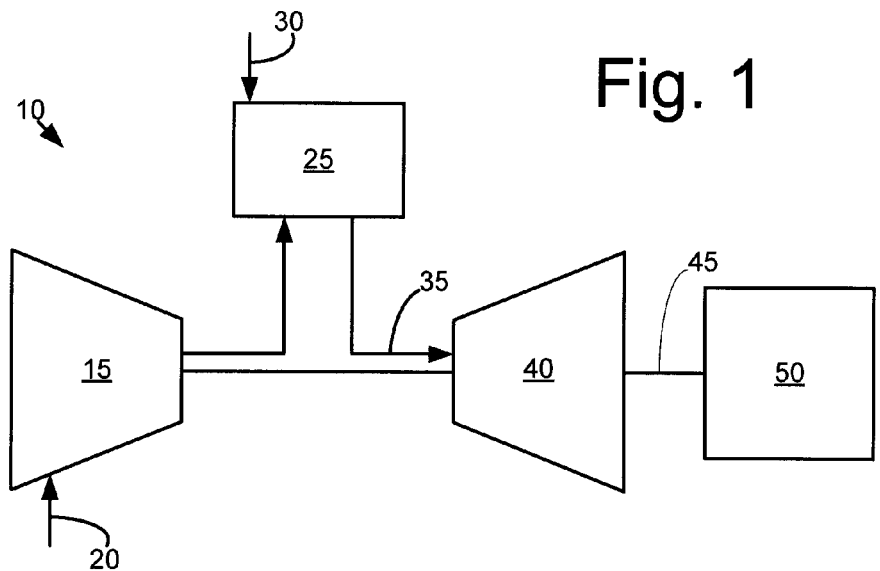
FIG. 1 is a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 includes a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, low grade fuel oils such a heavy fuel oils, various types of syngas, and/or other types of fuels. The gas turbine engine 10 may be any one of a number of different gas turbine engines offered by General Electric Company of Schenectady, New York, including, but not limited to, those such as a frame-7 or a frame-9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
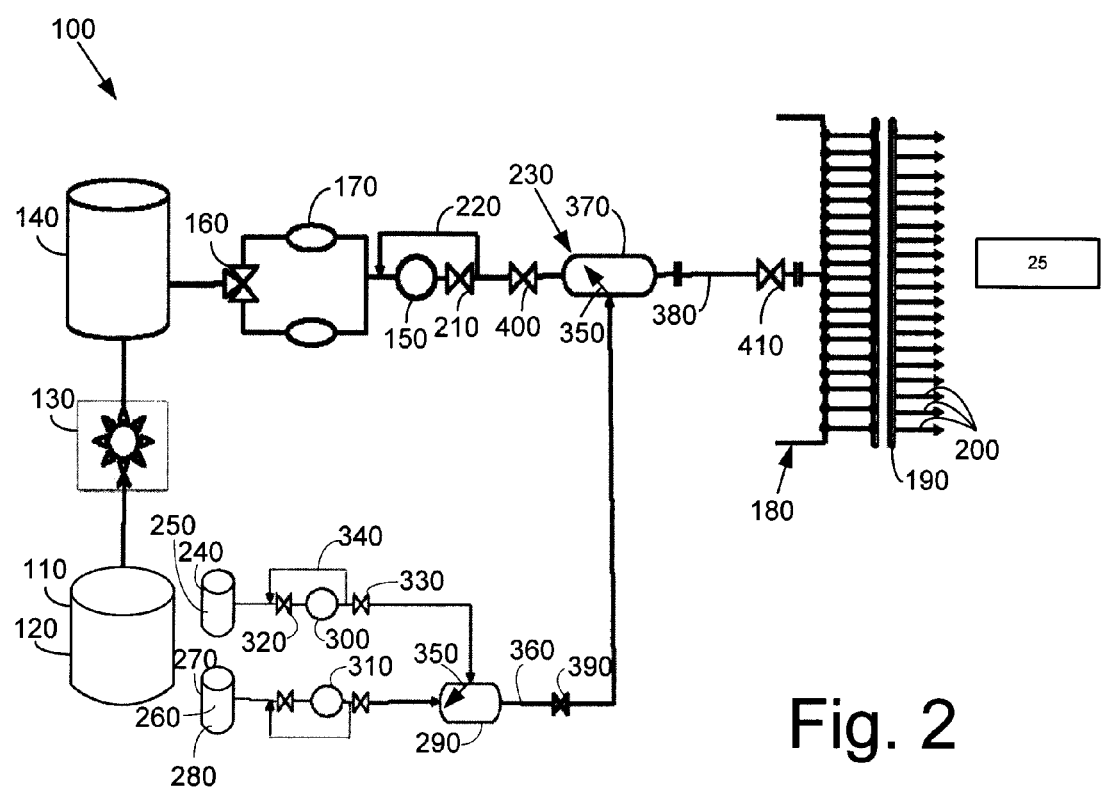

FIG. 2 shows a fuel delivery system 100 as may be described herein. The fuel delivery system 100 may be used with the combustors 25 of the gas turbine engine 10 as described above and the like. The fuel delivery system 100 may deliver a flow of heavy fuel oil 110 and the like to the combustors 25. Other types of low grade fuels including residual fuel oil and the like also may be used herein. As described above, the flow of heavy fuel oil 110 may include contaminants such as vanadium and the like therein.

The heavy fuel oil 110 may be stored in a raw fuel tank 120. The raw fuel tank 120 may have any size, shape, or configuration. The heavy fuel oil 110 may undergo a processing step downstream of the raw fuel tank 120 in a centrifuge 130 or other type of separation device. The centrifuge 130 may remove heavier impurities as well as water, solvents, absorbents, and the like. The centrifuge 130 may be of conventional design. The heavy fuel oil 110 may be stored in a clean fuel tank 140. The clean fuel tank 140 may have any size, shape, or configuration. The heavy fuel oil 110 may undergo processing steps before or after the raw fuel tank 120 and/or the clean fuel tank 140 in addition to those described herein.

The fuel delivery system 100 may include a main fuel pump 150 downstream of the clean fuel tank 140. The main fuel pump 150 may be of conventional design. The main fuel pump 150 may be in communication with the clean fuel tank 140 via one or more selection valves 160 and filters 170. The filters 170 may further remove contaminants from the flow of heavy fuel oil 110 in the form of particulates and the like. A flow divider 180 may be positioned downstream of the main fuel pump 150. The flow divider 180 may divide the flow of heavy fuel oil 110 according to the number of combustors 25 in use. The flow divider 180 may include a number of manifolds 190 and a number of outgoing fuel lines 200 in communication with the combustors 25. Although nineteen (19) outgoing fuel lines 200 are shown, any number of the fuel lines 200 may be used herein. A stop valve 210 and a bypass line 220 may be positioned between the main fuel pump 150 and the flow divider 180. Other components and other configurations may be used herein.

The fuel delivery system 100 also may include a magnesium mixing system 230 as may be described herein. The magnesium mixing system 230 many include a volume of magnesium 240 stored in a magnesium tank 250. The magnesium tank 250 may have any size, shape, or configuration. The magnesium mixing system 230 also may include a volume of a carrier fluid 260 stored in a carrier tank 270. The carrier tank 270 may have any size, shape, or configuration. In this example, the carrier fluid 260 may be a diesel fuel 280. Specifically, the diesel fuel 280 may be a zero to one hundred percent (0:100%) blend of a number 4 oil (a heavy oil gas cut) and a number 2 oil (a light oil gas cut). Other blends and other types of carrier fluids 260 may be used herein. Other components and other configurations may be used herein.

The magnesium mixing system 230 may include a carrier mixing chamber 290. The magnesium tank 250 may be in communication with the carrier mixing chamber 290 via a magnesium pump 300 and the carrier tank 270 may be in communication with the carrier mixing chamber 290 via a carrier pump 310. The pumps 300, 310 may be positive displacement and/or high head pumps and the like. A number of stop valves 320, check valves 330, bypass lines 340, and the like also may be used. The carrier mixing chamber 290 may include a number of angled counter flow nozzles 350 for the flow of magnesium 240. The flow of magnesium 240 may be injected at an angle via the angled counter flow nozzles 350 into the incoming carrier flow 260 for good mixing therein without the use of moving parts. Good mixing also may be promoted by injecting the flow of magnesium 240 into the carrier mixing chamber 290 at a higher pressure as compared to the carrier fluid 260. The carrier mixing chamber 290 may have any size, shape, or configuration. A mixed carrier flow 360 thus may exit the carrier mixing chamber 290. Other components and other configurations also may be used herein.

The magnesium mixing system 230 also may include a heavy fuel oil mixing chamber 370. The heavy fuel oil mixing chamber 370 may be positioned between the main fuel pump 150 and the flow divider 180, preferably immediately upstream of the flow divider 180 although other positions may be used herein. The heavy fuel oil mixing chamber 370 may be similar to the carrier mixing chamber 290 described above and may include the angled counter flow nozzles 350 therein without the use of moving parts. The heavy fuel oil mixing chamber 370 may have any size, shape, or configuration. The use of the angled counter flow nozzles 350 also promotes good mixing of the fluids therein. The mixed carrier flow 360 also may be injected under higher pressure than the heavy fuel oil flow 110. The heavy fuel oil mixing chamber 370 thus mixes the heavy fuel oil flow 110 and the mixed carrier flow 360 with the magnesium therein. A homogeneous flow 380 thus may exit the heavy fuel oil mixing chamber 370 and flow towards the flow divider 180 and the combustors 25 of the gas turbine engine 10. Various types of flow control valves 390, stop valves 400, and check valves 410 also may be used. Other components and other configurations also may be used herein.

The various valves and pumps described herein may control and regulate the delivery and distribution of the anti-corrosive additives into the carrier fluid, the carrier fluid with the anti-corrosive additive into the heavy fuel oil, and the anti-corrosive additive into the heavy fuel oil to form a homogeneous solution. Other fluid combinations may be used herein.

Positioning the heavy fuel oil mixing chamber 370 just upstream of the flow divider 180 thus provides minimal residence time for mixture separation or heavy fuel oil constituent dropout. Likewise, using the diesel fuel 280 as the carrier fluid 260 in the premixed carrier flow 360 improves the mixing process with the heavy fuel oil 110 so as to provide the homogeneous flow 380. The homogeneous flow 380 promotes an adequate delivery of the protective flow of magnesium 240. The flow of magnesium 240 thus combines with the vanadium and the like within the heavy fuel oil 110 to produce a soft ash that may be washed off of the hot gas path components during routine maintenance and the like. The homogeneous flow 380 thus reduces the level of hot gas path component corrosion that may be attributable to vanadium so as to improve overall reliability and availability of the gas turbine engine 10.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A fuel delivery system for use with a flow of heavy fuel oil for a gas turbine engine, comprising:
   one or more fuel lines in communication with the gas turbine engine; and a magnesium mixing system positioned upstream of the one or more fuel lines; the magnesium mixing system comprising a flow of magnesium and a flow of a carrier fluid, wherein the magnesium mixing system comprises a magnesium tank, magnesium pump, a carrier tank, and a carrier pump;
   a carrier mixing chamber in fluid communication with the flow of magnesium and the flow of carrier fluid, wherein the flow of magnesium is supplied to the carrier mixing chamber from the magnesium tank by the magnesium pump and the flow of carrier fluid is supplied to the carrier mixing chamber from the carrier tank by the carrier pump, wherein the carrier mixing chamber is configured to mix the flow of magnesium and the flow of the carrier fluid to form a mixed carrier flow; and a heavy fuel oil mixing chamber in fluid communication with the mixed carrier flow and the flow of heavy fuel oil, wherein the heavy fuel oil mixing chamber is configured to mix the flow of heavy fuel oil and the mixed carrier flow, wherein the carrier fluid comprises a diesel fuel.

2. The fuel delivery system of claim 1, wherein the one or more fuel lines comprise a flow divider.

3. The fuel delivery system of claim 2, wherein the flow divider comprises one or more manifold in communication with the one or more fuel lines.

4. The fuel delivery system of claim 1, wherein the carrier mixing chamber comprises one or more angled counter flow nozzles in communication with the flow of magnesium.

5. The fuel delivery system of claim 1, wherein the heavy fuel oil mixing chamber comprises one or more angled counter flow nozzles in communication with the mixed carrier flow.

6. The fuel delivery system of claim 1, wherein the flow of heavy fuel oil and the mixed carrier flow mix to form a homogenous flow.

7. The fuel delivery system of claim 1, further comprising a main fuel pump upstream of the magnesium mixing system.

8. The fuel delivery system of claim 1, further comprising a clean fuel tank upstream of magnesium mixing system.

9. The fuel delivery system of claim 1, further comprising a centrifuge upstream of magnesium mixing system.

10. The fuel delivery system of claim 1, further comprising a raw fuel tank upstream of magnesium mixing system.

11. A magnesium mixing system for use with a flow of heavy fuel oil for a gas turbine engine, comprising:
 a magnesium tank and a magnesium pump for supplying a flow of magnesium;
 a carrier tank and a carrier pump for supplying a flow of a carrier fluid;
 a carrier mixing chamber in fluid communication with the flow of magnesium and the flow of carrier fluid, wherein the flow of magnesium is supplied to the carrier mixing chamber from the magnesium tank by the magnesium pump and the flow of carrier fluid is supplied to the carrier mixing chamber from the carrier tank by the carrier pump, wherein the carrier mixing chamber is configured to mix the flow of magnesium and the flow of the carrier fluid to form a mixed carrier flow; and
 a heavy fuel oil mixing chamber in fluid communication with the mixed carrier fluid and the flow of heavy fuel oil, wherein the heavy fuel oil mixing chamber is configured to mix the flow of heavy fuel oil and the mixed carrier flow, wherein the carrier fluid comprises a diesel fuel.

12. The magnesium mixing system of claim 11, wherein the carrier mixing chamber comprises one or more angled counter flow nozzles in communication with the flow of magnesium.

* * * * *